(12) United States Patent
Hall

(10) Patent No.: US 7,028,489 B1
(45) Date of Patent: Apr. 18, 2006

(54) OVER-PRESSURIZATION PROTECTION SYSTEM FOR CRYOGENIC VESSEL

(75) Inventor: Ivan Keith Hall, Mobile, AL (US)

(73) Assignee: Harsco Technologies Corporation, Fairmont, MN (US)

( * ) Notice: Subject to any disclaimer, the term of this patent is extended or adjusted under 35 U.S.C. 154(b) by 91 days.

(21) Appl. No.: 10/742,968

(22) Filed: Dec. 22, 2003

(51) Int. Cl.
*F17C 13/02* (2006.01)
*E03B 7/07* (2006.01)

(52) U.S. Cl. ........................................ 62/49.1; 137/563
(58) Field of Classification Search ................ 62/49.1, 62/45.1; 137/563
See application file for complete search history.

(56) References Cited

U.S. PATENT DOCUMENTS

| | | | |
|---|---|---|---|
| 2,610,471 A * | 9/1952 | Thayer | 62/49.1 |
| 5,404,918 A | 4/1995 | Gustafson | |
| 5,421,161 A | 6/1995 | Gustafson | |
| 5,465,583 A * | 11/1995 | Goode | 62/50.2 |
| 5,537,828 A * | 7/1996 | Borcuch et al. | 62/50.1 |
| 5,916,246 A * | 6/1999 | Viegas et al. | 62/50.1 |
| 5,954,101 A * | 9/1999 | Drube et al. | 141/82 |
| 6,128,908 A | 10/2000 | Gustafson | |
| 2001/0025655 A1 * | 10/2001 | Yoshida et al. | 137/487.5 |
| 2002/0083719 A1 * | 7/2002 | Hughes et al. | 62/49.1 |

* cited by examiner

Primary Examiner—William C. Doerrler
(74) Attorney, Agent, or Firm—David C. Jenkins; Eckert Seamans Cherin & Mellott, LLC

(57) ABSTRACT

A dual purpose recirculation valve system for a cryogenic vessel includes a fill line, a delivery line assembly, a recirculation line and a recirculation valve. The cryogenic vessel defines a storage space and includes a pressure monitoring device structured to monitor the pressure in the storage space, as well as an electronic control system structured to receive input from the pressure monitoring device. The fill line is structured to be coupled to a bulk tank, whereby the storage space is filled with a cryogenic fluid. The delivery line assembly has a delivery coupling assembly and the delivery line assembly structured to remove the cryogenic fluid from the storage space and deliver the cryogenic fluid to the delivery coupling assembly. The recirculation line extends between, and is in fluid communication with both, the fill line and the delivery line assembly. The recirculation valve is disposed on the fill line at a location between the recirculation line and the storage space, the recirculation valve structured to close when the cryogenic vessel pressure exceeds a set limit. In this configuration, the recirculation valve acts as both a recirculation valve and as a valve to avert over-pressurization during a fill.

6 Claims, 1 Drawing Sheet

OVER-PRESSURIZATION PROTECTION SYSTEM FOR CRYOGENIC VESSEL

BACKGROUND OF THE INVENTION

1. Field of the Invention

This invention relates to a cryogenic vessel and, more specifically, to an over-pressurization protection system for a cryogenic vessel that is part of a cryogenic liquid delivery system.

2. Background Information

Cryogenic liquids, such as liquid argon, natural gas (LNG), nitrogen, oxygen, $CO_2$, hydrogen and the like, are substances that normally exist as gasses, but are liquids at cold temperatures. Special vessels and systems must be used to store and transfer cryogenic liquids because of difficulty in maintaining the extremely cold temperatures. Such vessels typically include a double walled vessel defining a storage space and having a vacuum in the annular space. The vessel has multiple lines extending into the storage space, including a fill line. If the vessel is not vented sufficiently, pressure within the vessel is increased during filling operations when the cryogenic liquid is pumped into the vessel through the fill line. To prevent damage to the vessel, it is desirable to maintain the vessel internal pressure within the design limits of the vessel.

To date, cryogenic vessels include a variety of safety features to prevent an over-pressurization situation from causing permanent damage to the cryogenic vessel. Such safety features include relief valves structured to vent gas to the atmosphere and burst disks structured to be ruptured in severe over-pressurization situations. The valves may have operated mechanically or may have been linked to a computer control system which had pressure monitoring devices and was structured to open the valves when an over-pressurization condition occurred. While these devices are sufficient to protect the vessel from damage, each has disadvantages. For example, the relief valves vent the gas to the atmosphere causing a loss of product. Further, venting to the atmosphere may be undesirable or dangerous in certain situations, such as venting LNG in an enclosed area. Burst disks rupture when a set pressure is exceeded. As such, al product within the vessel is lost and the burst disk must be replaced. Additionally, burst disks also vented gas to the atmosphere. Generally, these devices prevent damage to the vessel when an over-pressurization situation occurs, but do not avert over-pressurization situation from occurring.

Additionally, the cryogenic vessel may include a delivery system having a recirculation system. The delivery system includes a delivery line extending into the storage space and structured to deliver the cryogenic liquid to a bulk vessel or a cylinder. The delivery system may include a pump and a pressure building circuit. The recirculation system included a recirculation line having a recirculation valve thereon. The recirculation line extended between, and was in fluid communication with, the delivery line and the fill line. During the delivery of the cryogenic liquid to a bulk vessel, the recirculation valve closed so that the entire flow was directed to the bulk vessel. During the delivery of the cryogenic liquid to a cylinder, the recirculation valve opened so that any excess flow was returned to the cryogenic vessel. For example, the cryogenic vessel may be a movable bulk storage vessel, such as a delivery truck used to transport fuel to filling stations or other stationary bulk tanks. The cryogenic vessel is structured to fill both stationary bulk tanks, such as the filling station, as well as smaller, portable cylinders, or even a fuel tank on a vehicle.

There is a need, therefore, to have cryogenic vessel with an over-pressurization protection system.

There is a further need to reduce the cost of any such system by utilizing components already existing on the cryogenic vessel delivery system.

SUMMARY OF THE INVENTION

These needs, and others, are met by the invention which provides a dual purpose recirculation valve system for a cryogenic vessel delivery system. In the dual purpose recirculation valve system for a cryogenic vessel, the recirculation valve is disposed on the fill line at a location downstream, that is, closer to the cryogenic vessel, of the junction with the recirculation line. In this configuration, cryogenic liquid entering the storage space, either during a fill or from recirculation during a delivery, must pass through the recirculation valve. As such, while the valve's function remains the same for delivery procedures, the recirculation valve is further used to close the fill line any time the system is activated.

BRIEF DESCRIPTION OF THE DRAWINGS

A full understanding of the invention can be gained from the following description of the preferred embodiments when read in conjunction with the accompanying drawing in which.

DESCRIPTION OF THE PREFERRED EMBODIMENTS

Figure 1:
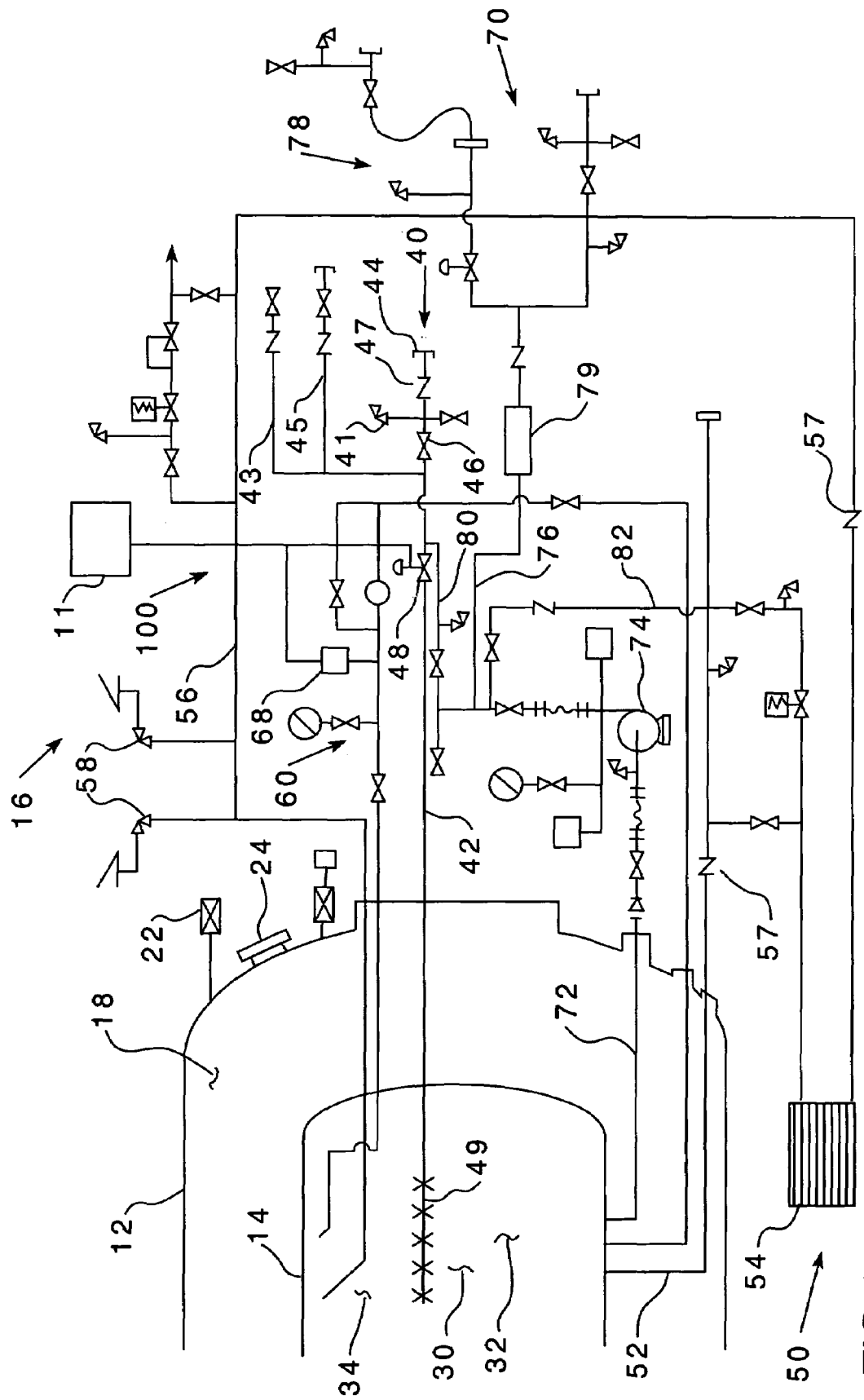
FIG. 1 is a schematic diagram of a cryogenic vessel.

As used herein, "fill" or "filling" refers to the act of transferring cryogenic liquid to the storage space inside the cryogenic vessel.

As used herein, "deliver" or "delivering" refers to the act of transferring cryogenic liquid out of the storage space inside the cryogenic vessel.

As shown in FIG. 1, a cryogenic vessel assembly 10 includes an electronic control system 11, a first, outer shell 12, a second, inner shell 14 and a plurality of lines 16. The cryogenic vessel assembly 10 may be part of a movable bulk storage vessel (not shown), such as a delivery truck used to transport fuel to filling stations. It is known in the art that on such movable bulk storage vessels the plurality of lines 16 may be enclosed in a housing 9 having access doors (not shown). The electronic control system 11 may be linked to the doors so that, when the doors are open, the electronic control system 11 is activated and monitoring the status of the vessel assembly 10. The first, outer shell 12 and the second, inner shell 14 are held in a spaced relation, creating an annular space 18. Preferably, a vacuum exists in the annular space 18 creating an insulating layer. The first, outer shell 12 includes a vacuum valve 22 and an outer shell safety head 24. Within the second, inner shell 14 is a storage space 30, that, when filled with a liquid, is divided into a liquid space 32 and a vapor space 34.

The plurality of lines 16 extend from a location within, and are in fluid communication with, the storage space 30, to a location outside of the first, outer shell 12. The plurality of lines 16 includes a fill line assembly 40, a pressure building circuit assembly 50, a pressure gage line assembly 60, and a delivery line assembly 70. The fill line assembly 40 includes a fill line 42, fill connection 44, a fill valve 46, and a recirculation valve 48. The fill line assembly 40 also may have a relief valve 41, a sample line 43, a delivery hose product recovery connection 45, a fill check valve 47 and a spray head 49. The fill line 42 is coupled to, and in fluid communication with, the fill connection 44. Downstream of the fill connection 44, and in sequential order moving along the fill line 42 toward the storage space 30, the fill line 42 includes the fill check valve 47, the fill valve 46, and the recirculation valve 48. Between the fill valve 46 and the recirculation valve 48 is the coupling of the recirculation line 80 (described below) and the fill line 42. In operation, the fill connection 44 is coupled to a bulk tank (not shown) filled with a cryogenic liquid. The cryogenic liquid travels through the fill line 42 until the cryogenic liquid is deposited in the storage space 30.

The pressure building circuit assembly 50 includes a fluid line 52, a vaporizer 54, and vapor line 56. The fluid line 52 extends to, and is in fluid communication with, the liquid space 32. The fluid line 52 terminates at, and is in fluid communication with, the vaporizer 54. The vapor line 56 is coupled to, and is in fluid communication with, the vaporizer 54 as well as the vapor space 34. The pressure building circuit assembly 50 further includes a plurality of check valves 57 structured to ensure the fluid moves in the proper direction as well as relief valves 58. In operation, the pressure building circuit assembly 50 is structured to remove a quantity of cryogenic liquid from the liquid space 32, vaporize the cryogenic liquid in the vaporizer 54, and return the gas to the vapor space 34, thereby pressurizing the storage space 30.

The pressure gage line assembly 60 includes a fluid line 62, a liquid level gage 64, a vapor line 66 and a pressure monitoring device, such as a pressure transducer 68, as well as a plurality of valves 69. The fluid line 62 extends to, and is in fluid communication with, the liquid space 32 as well as the liquid level gage 64. The vapor line 66 is coupled to, and is in fluid communication with the vapor space 34 as well as the liquid level gage 64. The pressure transducer 68 is coupled to the vapor line 66 and is structured to measure the pressure within the storage space 30. The pressure transducer 68 is further structured to provide an electronic signal carrying data indicative of the storage space pressure.

The delivery line assembly 70 includes a pump feed line 72, a pump 74, a delivery line 76, a delivery coupling assembly 78, and a recirculation line 80. The delivery line assembly 70 may include a pressure building circuit bridge line 82, structured to couple the delivery line 76 to the pressure building circuit assembly 50, and a flow meter 79. The delivery coupling assembly 78 includes a cylinder line 84, having a cylinder line valve 86, a cylinder coupler 88, and a bulk vessel line 90, having a bulk vessel line valve 92 and a bulk vessel coupler 94. The pump feed line 72 extends between, and is in fluid communication with both, the liquid space 32 and the pump 74. The pump 74 is in further fluid communication with the delivery line 76. The delivery line 76 is in further fluid communication with the delivery coupling assembly 78. The recirculation line 80 extends between, and is in fluid communication with both, the delivery line 76 and the fill line 42.

In operation, cryogenic liquid is drawn through the pump feed line 72 to the pump 74. The cryogenic liquid is further propelled by the pump 74 through the delivery line 76 to the delivery coupling assembly 78. The delivery coupling assembly 78 is coupled to either a cylinder at the cylinder coupler 88 or a bulk vessel at the bulk vessel coupler 94. Whichever line in the delivery coupling assembly 78, that is, either the cylinder line 84 or the bulk vessel line 90, that is not in use, is closed at either the cylinder line valve 86 or the bulk vessel line valve 92. Thus, the cryogenic liquid may be delivered to either a cylinder or a bulk vessel (not shown). If fluid is being delivered to a cylinder, the recirculation valve 48 is partially closed. Because the pressure in the receiving vessel is typically higher than the pressure in the delivery system, the cryogenic liquid will tend to flow through the recirculation valve 48. The position of the recirculation valve 48 is controlled so that cryogenic liquid is directed to the delivery coupling assembly 78 and any excess flow of cryogenic liquid through the delivery line 76, that is any cryogenic liquid that cannot be delivered to the cylinder due to flow restrictions, is diverted to the fill line 42 and returned to the storage space 30. If fluid is being delivered to a bulk vessel, the recirculation valve 48 is closed. Thus, all cryogenic fluid in the delivery line 76 is delivered to the bulk vessel.

In addition to controlling the recirculation from the delivery line 76, the recirculation valve 48 further controls flow through the fill line 42. That is, the electronic control system 11 is structured to actuate at least the recirculation valve 48. The electronic control system 11 is further structured to receive the input signal from the pressure transducer indicating the pressure in the storage space 30. The electronic control system 11 may be structured, or programmed, to close the recirculation valve 48 when the pressure within the storage space 30 reaches a set limit, for example, about 40 psig. During a fill operation, the pressure within the storage space 30 increases. When the pressure within the storage space 30 reaches the set limit, the electronic control system 11 closes the recirculation valve 48 and terminates the filling procedure. Accordingly, a dual purpose recirculation valve system 100 includes the fill line 42, the recirculation valve 48, the delivery line 76, and the recirculation line 80 where the recirculation line 80 extends between, and is fluid communication with both, the fill line 42 and the delivery line 76, and where the recirculation valve 48 is disposed on the fill line 42 at a location between said recirculation line 80 and the storage space 30.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A dual purpose recirculation valve system for a cryogenic vessel, said cryogenic vessel defining a storage space, with a pressure monitoring device structured to monitor the pressure in said storage space, an electronic control system structured to receive input from said pressure monitoring device, said dual purpose recirculation system comprising:

a fill line, structured to be coupled to a bulk tank, whereby said storage space is filled with a cryogenic fluid;

a delivery line assembly having a delivery coupling assembly, said delivery line assembly structured to remove said cryogenic fluid from said storage space and deliver said cryogenic fluid to said delivery coupling assembly;

a recirculation line extending between, and in fluid communication with both, said fill line and said delivery line assembly; and a recirculation valve disposed on said fill line at a location between said recirculation line and said storage space, said recirculation valve structured to close when said cryogenic vessel pressure exceeds a set limit.

2. The dual purpose recirculation valve system for a cryogenic vessel of claim 1, wherein:
said delivery line assembly includes a pump feed line, a pump, and a delivery line;
said pump feed line extending between, and in fluid communication with both, said liquid space and said pump;
said pump in further fluid communication with said delivery line;
said delivery line in further fluid communication with said delivery coupling assembly; and
said recirculation line extending between, and in fluid communication with both, said delivery line and said fill line.

3. The dual purpose recirculation valve system for a cryogenic vessel of claim 1, wherein said electronic control system is structured to close said recirculation valve when the cryogenic vessel pressure exceeds a pressure of about 40 psig.

4. A cryogenic vessel comprising:
a first, outer shell;
a second, inner shell disposed with said first, outer shell and defining a storage space;
a pressure monitoring device structured to monitor the pressure in said storage space and to send a signal indicative of the pressure within the storage space;
an electronic control system structured to receive input from said pressure monitoring device;
a dual purpose recirculation valve system comprising:
a fill line, structured to be coupled to a bulk tank, whereby said storage space is filled with a cryogenic fluid;
a delivery line assembly having a delivery coupling assembly, said delivery line assembly structured to remove said cryogenic fluid from said storage space and deliver said cryogenic fluid to said delivery coupling assembly;
a recirculation line extending between, and in fluid communication with both, said fill line and said delivery line assembly; and
a recirculation valve disposed on said fill line at a location between said recirculation line and said storage space, said recirculation valve structured to close when said cryogenic vessel pressure exceeds a set limit.

5. The cryogenic vessel of claim 4, wherein:
said delivery line assembly includes a pump feed line, a pump, and a delivery line;
said pump feed line extending between, and in fluid communication with both, said liquid space and said pump;
said pump in further fluid communication with said delivery line;
said delivery line in further fluid communication with said delivery coupling assembly; and
said recirculation line extending between, and in fluid communication with both, said delivery line and said fill line.

6. The cryogenic vessel of claim 4, wherein said electronic control system is structured to close said recirculation valve when the cryogenic vessel pressure exceeds a pressure of about 40 psig.

* * * * *